UNITED STATES PATENT OFFICE.

ALFRED A. BENNETT, OF TOLEDO, OHIO, ASSIGNOR TO THE COPPERSTONE PRODUCTS COMPANY, OF TOLEDO, OHIO, A CORPORATION OF OHIO.

CEMENT COMPOSITION.

1,310,520.    Specification of Letters Patent.    Patented July 22, 1919.

No Drawing.    Application filed May 6, 1918. Serial No. 232,734.

*To all whom it may concern:*

Be it known that I, ALFRED A. BENNETT, a citizen of the United States, and a resident of Toledo, in the county of Lucas and State of Ohio, have invented a certain new and useful Cement Composition; and I do hereby declare the following to be a full, clear, and exact description of the invention, such as will enable others skilled in the art to which it appertains to make and use the same.

My invention relates to the production of a hardened plastic composition which will have the necessary characteristics that it may be used for forming a hard durable structure that will sustain jarring and strains of an unusual character and at the same time is impermeable to water. The composition produced by my invention by reason of its characteristics may be used to produce a flooring or covering composition that will have a long life notwithstanding the heavy wear and arduous jarring that a much and heavily used floor may be subjected to. Also by reason of its impermeability and flexibility whereby it will withstand the cross strains it may be used in building of hulls of concrete ships.

I have discovered that a hardened cement composition formed of Portland cement and conglomerate copper stamp sand in proper proportions will produce, when laid from about 1″ to about 2″ thick on concrete or iron surfaces, a surface or a finishing layer that will withstand long heavy wear without cracking and breaking or pulverizing. The surfacing material thus forms a durable finishing layer for road beds or flooring where there is heavy trucking and for iron stairs and hallways, such as in factories, public buildings, etc., and for building of ship hulls, although it may be used for forming a finishing surface and structures wherever it may be found desirable. The composition is moreover of such a character that it may be subjected to free and frequent washings without deterioration. Also a fairly good polish may be produced on the surface when stoned down.

The cement finishing material is formed of Portland cement and an aggregate known as the conglomerate copper stamp sand obtained from the stamping mills where the conglomerate from copper mines is crushed to small size and then stamped, from which the copper is removed, leaving the conglomerate copper sand stampings. The copper stamp sand or tailings used is that or similar to that obtained from the Franklin Mining Company at Point Mills, Michigan, in gradings of different sizes. The analysis of the conglomerate is:—

| | |
|---|---:|
| Silica | 60.84 |
| Alumina | 16.29 |
| Sesquioxid of iron | 10.04 |
| Calcium oxid | 3.56 |
| Magnesia | 1.61 |
| Sodium and potassium oxid | 6.34 |
| Loss on ignition | 2.05 |
| Metallic copper | .61 |

Also traces of sulfates and chlorids.

The gradings or sizes of the conglomerate used in the composition varies according to the results desired. The gradings will run from about ¼″ in size to that that will pass through 200 wires to the inch. That remaining on 10 wires to the inch will be 21.40%; that remaining on 20 wires to the inch would be 28.10%; that remaining on 40 wires to the inch will be 28.40%; on 60 wires to the inch 7.60%; on 80, 5.00%; on 100, 4.70%; on 200, 2.80%; through 200 wires to the inch, 2%, making a total of 100%.

In forming the mixture, one part of Portland cement of a good grade is mixed with one to two parts of the aggregate and then with sufficient amount of water to render it plastic or to cause it to unify when set. This proportion, however, is varied according to the uses that the hardened composition is to be put.

I claim:—

1. A hardened composition formed of Portland cement and conglomerate copper stamp sand substantially as described.

2. A hardened composition formed of Portland cement and a conglomerate copper stamp sand having the analysis of silica 60%, alumina 16%, sesquioxid of iron 10%, calcium oxid 3.5%, magnesia 1.6%, sodium and potassium oxids 6%, metallic copper .6%.

3. A hardened composition formed of Portland cement and a conglomerate copper stamp sand having gradings running from about ¼″ in size to that that will pass through 200 wires to the inch.

4. A hardened composition formed of Portland cement and a conglomerate copper stamp sand having gradings running from about ¼" in size to that that will pass through 200 wires to the inch, the amount remaining on 60, 80, 100 and 200 wires to the inch, and that will pass through 200 wires to the inch, decreasing in amount from about 8% to about 2% and approximately ⅓ of the total remaining amount remaining on 10, 20 and 40 to the inch, each.

In testimony whereof, I have hereunto signed my name to this specification.

ALFRED A. BENNETT.

Copies of this patent may be obtained for five cents each, by addressing the "Commissioner of Patents Washington, D. C."